United States Patent
Künzel (10) Patent No.: US 11,726,446 B2
(45) Date of Patent: Aug. 15, 2023

(54) DRIVE CONTROLLER WITH SELF-CONTAINED CORRECTION FUNCTION OF POSITION ERRORS

(71) Applicant: Siemens Aktiengesellschaft, Munich (DE)

(72) Inventor: Stefan Künzel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 120 days.

(21) Appl. No.: 16/955,610

(22) PCT Filed: Nov. 19, 2018

(86) PCT No.: PCT/EP2018/081739
§ 371 (c)(1),
(2) Date: Jun. 18, 2020

(87) PCT Pub. No.: WO2019/120811
PCT Pub. Date: Jun. 27, 2019

(65) Prior Publication Data
US 2021/0072722 A1    Mar. 11, 2021

(30) Foreign Application Priority Data
Dec. 21, 2017 (EP) .................................. 17209247

(51) Int. Cl.
*G05B 19/402* (2006.01)
*G05B 19/404* (2006.01)

(52) U.S. Cl.
CPC ......... *G05B 19/402* (2013.01); *G05B 19/404* (2013.01); *G05B 2219/41125* (2013.01)

(58) Field of Classification Search
CPC ................ G05B 19/402; G05B 19/404; G05B 2219/41125; H02P 6/16
See application file for complete search history.

(56) References Cited

U.S. PATENT DOCUMENTS

2004/0245953 A1* 12/2004 Peterson ................... H02P 6/16
                                                        318/400.09
2005/0093498 A1*  5/2005 Hill .......................... H02P 6/12
                                                        318/400.04
(Continued)

FOREIGN PATENT DOCUMENTS

DE    10 2004 050 999 A1    6/2005

OTHER PUBLICATIONS

Vasylius, M., Didžiokas, R., Mažeika, P. and Barzdaitis, V., 2008. The rotating system vibration and diagnostics. Mechanika/Mechanics, 72(4), pp. 54-58. (Year: 2008).*
(Continued)

*Primary Examiner* — Alicia M. Choi
(74) *Attorney, Agent, or Firm* — Henry M. Feiereisen LLC (57) ABSTRACT

A drive controller controls an electric drive of an electric machine receiving electric energy via a converter. The drive controller has a normal operating mode and a special operating mode. In the special operating mode, the drive controller determines control signals for the converter and rotates the rotor shaft first at a starting rotational speed. The rotor shaft then coasts without an applied external force, with the drive controller determining from raw signals continuously received from a position sensor raw positions of the rotor shaft, and determining therefrom correction variables for use in the normal operating mode. In the normal operating mode, the drive controller determines from continuously received raw signals in combination with the correction variables determined in the special operating mode an actual position of the rotor shaft and controls the converter with control signals based on the actual position or rotational speed of the electrical machine.

8 Claims, 5 Drawing Sheets

(56) References Cited

U.S. PATENT DOCUMENTS

| | | | | |
|---|---|---|---|---|
| 2005/0275361 A1* | 12/2005 | Bolt | ............ | H02P 6/182 318/400.04 |
| 2006/0186841 A1* | 8/2006 | Piefer | ............ | H02P 5/56 318/85 |
| 2006/0222509 A1* | 10/2006 | Kah | ............ | G05B 19/44 417/44.1 |
| 2010/0250055 A1* | 9/2010 | Ito | ............ | F16H 61/12 701/29.2 |
| 2011/0115422 A1* | 5/2011 | Takeuchi | ............ | H02P 6/16 318/400.13 |
| 2011/0169432 A1* | 7/2011 | Dean | ............ | H02P 7/2805 318/3 |
| 2012/0193177 A1* | 8/2012 | Goto | ............ | F16D 65/567 188/161 |
| 2013/0041534 A1* | 2/2013 | Kim | ............ | B60W 50/08 701/22 |
| 2013/0140801 A1* | 6/2013 | Schlee | ............ | B62D 57/024 280/762 |
| 2014/0232316 A1* | 8/2014 | Philipp | ............ | A61B 17/1622 318/504 |
| 2018/0236895 A1* | 8/2018 | Hanaka | ............ | H02P 25/064 |
| 2018/0277019 A1* | 9/2018 | Wrobel | ............ | G09B 19/14 |
| 2019/0337390 A1* | 11/2019 | Koerner | ............ | B60L 7/14 |

OTHER PUBLICATIONS

Joshi, B., Shrestha, R. and Chaudhar, R., 2014, October. Modeling, Simulation and Implementation of Brushed DC Motor Speed Control Using Optical Incremental Encoder Feedback. In Proceedings of IOE Graduate Conference. (Year: 2014).*

PCT International Search Report and Written Opinion of International Searching Authority dated Jun. 3, 2019 corresponding to PCT International Application No. PCT/EP2018/081739 filed Nov. 19, 2018.

* cited by examiner

$$A = \begin{pmatrix} \cos(\alpha(t0)) & \sin(\alpha(t0)) & 1 & t0 & t0^2 & t0^3 \\ \cos(\alpha(t1)) & \sin(\alpha(t1)) & 1 & t1 & t1^2 & t1^3 \\ \vdots & \vdots & \vdots & \vdots & \vdots & \vdots \\ \cos(\alpha(tN)) & \sin(\alpha(tN)) & 1 & tN & tN^2 & tN^3 \end{pmatrix}$$

FIG 11

$$A = \begin{pmatrix} \cos(\alpha(t0)) & \sin(\alpha(t0)) & \cos(2\alpha(t0)) & \sin(2\alpha(t0)) & 1 & t0 & t0^2 & t0^3 \\ \cos(\alpha(t1)) & \sin(\alpha(t1)) & \cos(2\alpha(t1)) & \sin(2\alpha(t1)) & 1 & t1 & t1^2 & t1^3 \\ \vdots & \vdots & \vdots & \vdots & \vdots & \vdots & \vdots & \vdots \\ \cos(\alpha(tN)) & \sin(\alpha(tN)) & \cos(2\alpha(tN)) & \sin(2\alpha(tN)) & 1 & tN & tN^2 & tN^3 \end{pmatrix}$$

FIG 12

$$b = \begin{pmatrix} \alpha'(t0) \\ \alpha'(t1) \\ \vdots \\ \alpha'(tN) \end{pmatrix}$$

DRIVE CONTROLLER WITH SELF-CONTAINED CORRECTION FUNCTION OF POSITION ERRORS

CROSS-REFERENCES TO RELATED APPLICATIONS

This application is the U.S. National Stage of International Application No. PCT/EP2018/081739, filed Nov. 19, 2018, which designated the United States and has been published as International Publication No. WO 2019/120811 A1 and which claims the priority of European Patent Application, Serial No, 17,209,247.0, filed Dec. 21, 2017, pursuant to 35 U.S.C. 119(a)-(d).

BACKGROUND OF THE INVENTION

The present invention is based on a drive controller for an electric drive which comprises an electric machine supplied with electrical energy via a converter, wherein the drive controller in normal operation continuously
  receives respective raw signals from a position transmitter detecting a rotational position of a rotor shaft of the electric machine,
  based on the respective raw signals in conjunction with correction variables determines a respective actual position of the rotor shaft and
  as a function of a respective target position and the respective actual position or of a respective target rotational speed and an actual rotational speed of the rotor shaft determined using the respective actual position determines respective control signals for the converter and outputs them to the converter.

The present invention is further based on an electric drive which comprises a converter, an electric machine supplied with electrical energy via a converter and a drive controller.

A position transmitter is frequently attached to the rotor shaft in controlled electric machines to measure the position or speed. The position transmitter thereupon supplies respective raw signals during operation of the electric machine, based on which a respective actual position of the rotor shaft is determined and/or a respective actual rotational speed of the rotor shaft is determined with differentiation of the respective actual position. The respective actual signal is thereupon used for position control to a target position or the respective actual rotational speed is used for rotational speed control to a target rotational speed.

In practice it is often the case that the motor shaft and the transmitter shaft are misaligned—albeit only slightly—in respect of one another. This type of misalignment results in a systematic measurement error in the raw signals output by the position transmitter. The measurement error is periodic to the rotational position of the rotor shaft, i.e. the actual position. In some cases the error comprises exclusively or virtually exclusively a component whose periodicity corresponds to the periodicity of the rotational position (fundamental oscillation). In other cases the error additionally comprises further components whose periodicity corresponds by an integer multiple to the periodicity of the rotational position (harmonics). The first harmonic, at which the periodicity of the error corresponds to double the periodicity of the rotational position, is in particular often of importance. The errors are especially objectionable if the rotational speed is determined by differentiation from the determined actual position. This is because as a result of the differentiation the amplitude of the error increases in proportion to the rotational speed.

In the optimum case the error is prevented or at least kept small by a correspondingly precise positioning of the transmitter on attachment to the electric machine. In other cases the error is taken into account by correction variables. The present invention relates to the latter procedure, in which the error is taken into account by correction variables.

The object of the present invention is to create opportunities by means of which the requisite correction variables can be determined easily and reliably.

SUMMARY OF THE INVENTION

According to one aspect of the invention, the object is achieved by a drive controller for an electric drive, which comprises an electric machine supplied with electrical energy via a converter, wherein in normal operation the drive controller continuously
  receives respective raw signals from a position transmitter detecting a rotational position of a rotor shaft of the electric machine,
  based on the respective raw signals in conjunction with correction variables determines a respective actual position of the rotor shaft, and
  as a function of a respective target position and the respective actual position or of a respective target rotational speed and an actual rotational speed of the rotor shaft determined using the respective actual position determines respective control signals for the converter and outputs them to the converter,
wherein in a special operation the drive controller
  first determines control signals for the converter, based on which the rotor shaft rotates at an initial rotational speed, and outputs these control signals to the converter,
  thereupon operates the electric machine so as not to exert a force so that the rotor shaft coasts down,
  during the coasting down of the rotor shaft continuously receives respective raw signals from the position transmitter and based on the respective raw signals determines and stores a respective raw position of the rotor shaft,
  determines the correction variables based on a plurality of raw positions determined during the special operation, and stores the correction variables in a correction variable storage unit of the drive controller, such that in normal operation they are available for determining the respective actual position, Advantageous embodiments of the drive controller form the subject matter of the dependent claims.

Thanks to this procedure the correction variables can be determined by the drive controller itself, without the need for further components. In particular it is not necessary to determine the correction variables differently, for example by means of a longer position transmitter, which for its part may be faulty or may have to be positioned with great precision.

The special operation is preferably only maintained for as long as the rotor shaft rotates sufficiently fast. The drive controller hence preferably checks in special operation, based on the respective raw signals in each case, whether a current rotational speed of the rotor shaft reaches or undershoots a minimum rotational speed. On reaching or undershooting the minimum rotational speed the drive controller terminates the determination and buffering of the raw positions and instead determines the correction variables. This approach is based on the thought that at a sufficiently high rotational speed (i.e. a rotational speed above the minimum rotational speed), disruptions to the uniform rotation, for example by slot detent torques and suchlike, are sufficiently small that they can be ignored. At a lower rotational speed (i.e. a rotational speed below the minimum rotational speed) such disruptions may in contrast bring about errors that can no longer simply be ignored.

Generally the drive controller models the coasting down of the rotor shaft in accordance with a model that has a number of model parameters. The drive controller preferably determines not only the correction variables based on the raw positions determined in special operation, but also the model parameters. As a result, errors caused in particular by the model as such can be reduced or prevented.

The model can for example have the form $$\alpha = \sum_{i=0}^{N1} ki \cdot t^i \quad (1)$$

where t is the time from the start of the non-powered operation of the electric machine and ki are the model parameters. The model parameter k0 is determined by the raw position at the time of the start of the non-powered operation of the electric machine, the model parameter k1 by the initial rotational speed. The model parameters k2, k3, etc., model the gradual coasting down as such. In particular the model parameter k2 models the delay caused by friction and suchlike and the model parameter k3 models the jerk.

The highest power of time considered in the model is at least the second power of time, i.e. the acceleration. Otherwise it would be assumed that the rotational speed set once—i.e. the initial rotational speed—remains constant. It is often sufficient if the highest power of time considered in the model is the third power of time, i.e. the jerk. In some cases it may however also be necessary to consider in addition the fourth power of time. Although it is possible to take even higher powers of time into account, it is generally not necessary.

For error correction the drive controller determines a respective raw position in normal operation from the respectively received raw signals and then the associated respective actual position of the rotor shaft from the respective raw position based on the relationship $$\alpha = \alpha' - \sum_{j=1}^{N2} [rej \cdot \cos(j\alpha') + imj \cdot \sin(j\alpha')] \quad (2)$$

Here α is the respective actual position and α' the respective raw position. rej and imj are the correction variables. Depending on the position of the individual case it may be sufficient to take only one-fold of the respective raw position into consideration in normal operation, i.e. only the fundamental frequency. If integer multiples of the respective raw position also have to be taken into consideration, it is often sufficient to take the first harmonic into consideration in addition to the fundamental frequency, in other words twice the respective raw position.

The drive controller preferably determines the correction variables based on an overdetermined equation system, wherein the drive controller further determines the correction variables in accordance with a method in which the error squares are minimized. As a result, the accuracy of the determination of the correction variables can be increased.

According to another aspect of the invention, the object is achieved by an electric drive which includes a converter, an electric machine supplied with electrical energy via the converter, and a drive controller as set forth above.

BRIEF DESCRIPTION OF THE DRAWING

The afore-described properties, features and advantages of this invention as well as the manner in which they are achieved will become clearer and more comprehensible in conjunction with the following description of the exemplary embodiments, which are explained in more detail in conjunction with the drawings, which show, in a schematic representation:

FIG. 1 an electric drive and its controller,
FIG. 2 a drive controller,
FIG. 3 to 5 a flow diagram in each case,
FIG. 6 a time diagram,
FIG. 7 a proposed solution for determining correction variables and model parameters,
FIGS. 8 and 9 a solution vector in each case,
FIGS. 10 and 11 a matrix in each case, and
FIG. 12 a raw position vector.

DETAILED DESCRIPTION OF PREFERRED EMBODIMENTS

Figure 1:
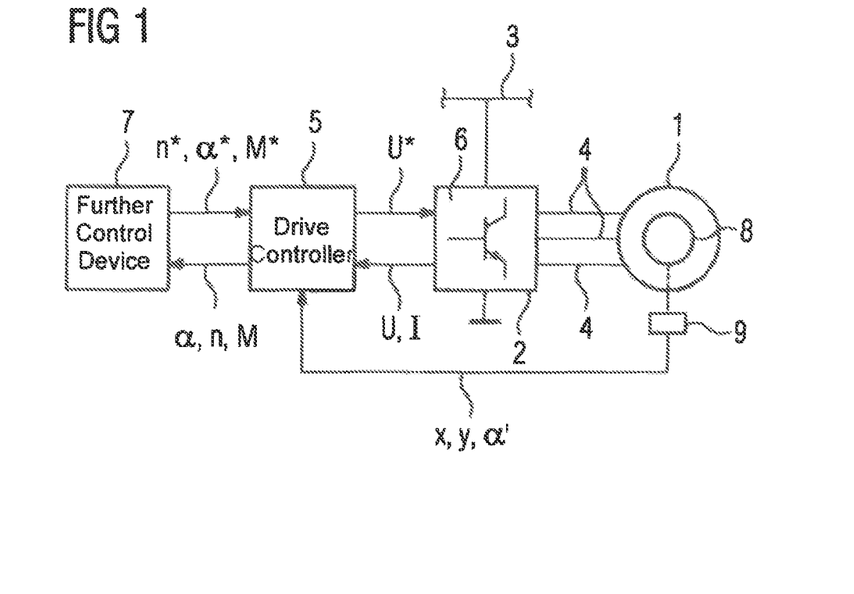

According to FIG. 1 an electric drive comprises an electric machine 1. The electric machine 1 is supplied with electrical energy via a converter 2. The converter 2 is in turn connected to a supply grid 3 or suchlike. The converter 2 comprises in particular the gating units for temporary powering on of the supply grid 3 to the phases 4 of the electric machine 1. Control signals U* are fed to the converter 2 by a drive controller 5, for example in the form of target phase voltages. Based on the control signals U* the converter 2 determines the associated actuation of internal semiconductor switching elements 6, for example of IGBTs. Only one of the internal semiconductor switching elements 6 is indicated in FIG. 1. By means of the internal semiconductor switching elements 6 the powering on of the supply grid 3 to the phases 4 of the electric machine 1 is implemented. The converter 2 conversely returns actual variables U, I to the drive controller 5. The actual variables U, I can for example be an intermediate circuit voltage of an intermediate circuit upstream of the semiconductor switching elements 6, actual phase voltages and actual phase currents. The communication between the converter 2 and the drive controller 5—in other words the transmission of the control signals U* and the transmission of the actual variables U, I—takes place with a current controller clock rate which is generally at least 8 kHz, sometimes also larger values such as 16 kHz or 32 kHz for example.

Figure 2:
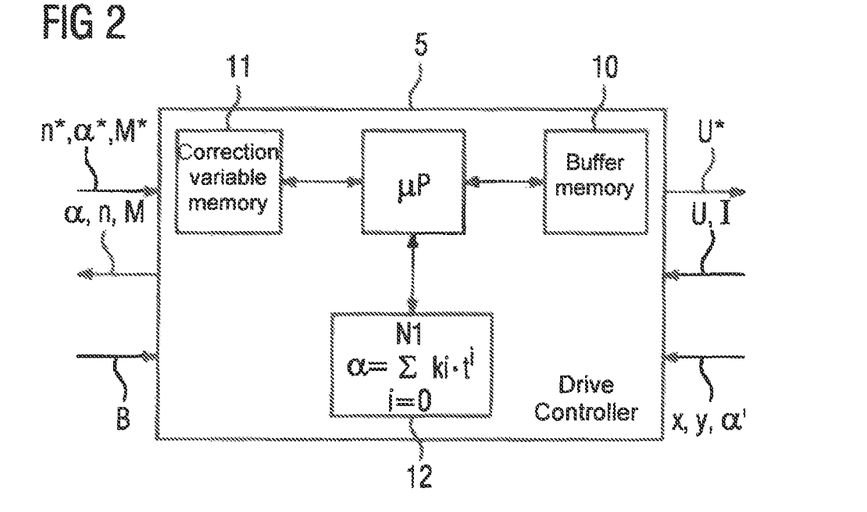

The drive controller 5 is shown in FIG. 2. In individual cases it can also act as a sole control device for the electric machine 1. Generally the drive controller 5 is however subject to a further control device 7 in accordance with the illustration in FIG. 1. The further control device 7 can be embodied for example as a numeric controller (CNC=computer numerical control) or as a motion controller (MC=motion control). In this case the drive controller 5 receives at least one higher-level target value from the further control device 7 and transmits at least one higher-level actual value to the further control device 7. The higher-level target value is normally the rotational speed target value n*. It can however alternatively be a position target value α* or a torque target value M*. The higher-level actual value is generally a position actual value α. Alternatively however it can also be a rotational speed actual value n or a torque actual value M. It is also possible for the drive controller 5 to transmit multiple actual values to the further control device 7, for example a position actual value α and additionally a rotational speed actual value n.

The communication between the drive controller 5 and the further control device 7—in other words the transmission of the higher-level target values and the transmission of the actual values—takes place with a further operating clock rate which depending on the type of the higher-level target value is a rotational speed controller clock rate or a position controller clock rate or a torque controller clock rate. The further operating clock rate is generally at least 8 kHz, sometimes also larger values such as 16 kHz or 32 kHz for example. In each case however the further operating clock rate is maximally as large as the current controller clock rate. Thus if for example the current controller clock rate is 16 kHz, the further operating clock rate can be 8 kHz or 16 kHz for example, but not 32 kHz.

The position actual value α—also referred to as the actual position α below—corresponds to the present rotational position of a rotor shaft 8 of the electric machine 1. The actual position α or an actual rotational speed n (i.e. the rotational speed actual value) determined using the actual position α is used internally by the drive controller 5 to correctly determine the control signals U*. A position transmitter 9 is present to detect the rotational position=actual position α. The position transmitter 9 detects transmitter signals, for example what is known as a sine signal y and a cosine signal x. It is possible for the position transmitter 9 itself to determine an angle α' (=raw position α') from the sine signal y and the cosine signal x and to transmit the angle α' to the drive controller 5 as a raw signal α'. Alternatively it is possible for the position transmitter 9 to transmit the sine signal y and the cosine signal x to the drive controller 5 as raw signals x, y and for the drive controller 5 to determine the raw position α' therefrom. Which of these two procedures is adopted is of minor importance within the context of the present invention. It is also alternatively possible to transmit the signals transmitted directly from the position transmitter 9 to the drive controller 5 directly to the drive controller 5 or to transmit them via the converter 2 to the drive controller 5. Here too it is of minor importance within the context of the present invention which of these two procedures is adopted. What is crucial is that the transmission takes place at the current controller clock rate.

Figure 3:
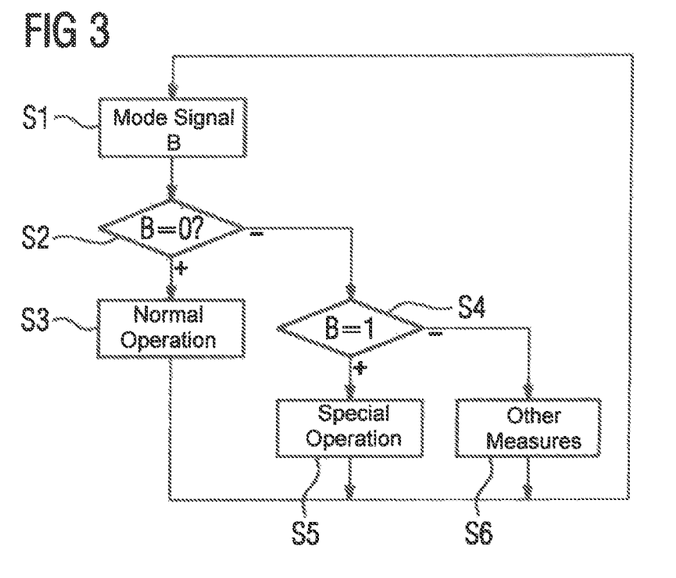

According to FIG. 3 the drive controller 5 operates as follows:

In a step S1 the drive controller 5 receives a mode signal B. The mode signal B can have at least two different values, referred to below as 0 and 1. Other values are also possible as appropriate. In a step S2 the drive controller 5 checks whether the mode signal B has the value 0. In this case the drive controller 5 moves on to a step S3. In step S3 the drive controller 5 executes a normal operation. The normal operation is explained in greater detail below by reference to FIG. 4. Otherwise the drive controller 5 checks in a step S4 whether the mode signal B has the value 1. In this case the drive controller 5 moves on to a step S5. In step S5 the drive controller 5 executes a special operation. Otherwise the drive controller 5 moves on to a step S6. In step S6 the drive controller 5 executes other measures which are of minor importance within the context of the present invention. The sequence of steps S1, S2, S3 takes place at the current controller clock rate. The step S5 and where appropriate also the step S6 can take a longer time.

It is also possible for the mode signal B to assume exclusively the values 0 and 1. In this case the steps S4 and S6 can be omitted and where appropriate it is possible to move directly from step S2 to step S5.

Figure 4:
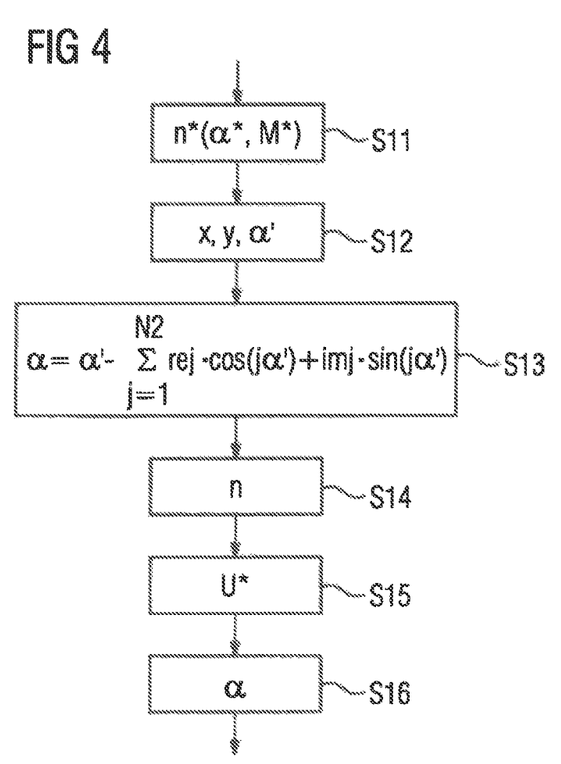

The normal operation is explained below in conjunction with FIG. 4.

In normal operation a higher-level target value becomes known to the drive controller 5 in a step S11. For example, the drive controller 5 can receive a rotational speed target value n* from the further control device 7 in the step S11 or can use the most recently received rotational speed target value n* again. In a step S12 the drive controller 5 receives from the position transmitter 9 the latter's raw signals x, y, α'.

In a step S13 the drive controller 5 determines an actual position α of the rotor shaft 8 from the raw signals x, y, α'. In particular the drive controller 5 determines the actual position α from the associated raw position α' in conjunction with correction variables rej, imj (where j=1, 2, 3, . . . ). If the drive controller 5 has received the sine signal y and the cosine signal x in step S12 as raw signals, the drive controller 5 determines in step S13 the raw position α' previously from the raw signals x, y. Otherwise the raw signal α' itself is already the raw position α', and the determination of the raw position α' is therefore of minor importance.

The step S13 can be configured differently. In particular it is possible for the drive controller 5 in step S13 to determine the actual position α in accordance with the relationship $$\alpha = \alpha' - \sum_{j=1}^{N2} [rej \cdot \cos(j\alpha') + imj \cdot \sin(j\alpha')] \tag{3}$$

Equivalent to this would be a determination in which terms with the same frequency (in other words terms with the same index j) are combined such that a sine or a cosine only has to be determined a single time, but not both the sine and the cosine.

In the simplest case the index j can only assume the value 1. Alternatively the index j can assume the value 2. Higher values than 2 are likewise possible, but are generally not necessary.

Where necessary the drive controller 5 determines the actual rotational speed n in a step S14. Where the determination is performed, it is performed using the actual position α, in particular by time differentiation of the actual position α. In a step S15 the drive controller 5 determines, for example based on the rotational speed target value n* and the actual rotational speed n or the position target value α* and the associated actual position α, the associated control signals U* for the converter 2 and outputs them to the converter 2. Where necessary, in a step S16 the drive controller 5 furthermore transmits the actual position α or another variable, for example the actual rotational speed n, to the further control device 7.

The special operation is explained below in conjunction with FIG. 5.

In special operation the drive controller 5 initially deletes the contents of a buffer memory 10 in a step S21. Next in a step S22 the drive controller 5 determines control signals U* for the converter 2 which cause the rotor shaft 8 to rotate at an initial rotational speed n. The determination of such control signals U* is well known to persons skilled in the art. In step S22 these control signals U* are also output to the converter 2. The initial rotational speed n1 is chosen to be relatively high, for example several 1000 rpm. FIG. 6 shows this status in the negative region of the time axis. The initial rotational speed n1 is set at 6000 rpm in the example in FIG. 6. This concrete value of the initial rotational speed n1 is however purely by way of example.

Then in a step S23 the drive controller 5 determines other control signals U* for the converter 2. These control signals U* cause the drive controller 5 to operate the electric machine 1 in a non-powered manner. The determination of such control signals U* is also well known to persons skilled in the art. For example, the output of switching pulses to the internal semiconductor switches 6 of the converter 2 can be blocked or the current target value for the phases 4 can be set to 0. These control signals U* are also output to the converter 2 in step S23. The performance of step S23 is retained in the further procedure, i.e. in particular in the course of the repeated performance of steps S24 to S27. It is also possible to achieve this by making step S23 into a component part of the loop containing steps S24 to S27.

Because of the non-powered operation of the electric machine 1 the rotor shaft 8 coasts down. The rotational speed n of the rotor shaft 8 thus gradually diminishes in accordance with the illustration in FIG. 6 because of frictional losses in the bearings of the electric machine 1, or external forces, even if only the—albeit low level of—air friction of the rotating rotor shaft 8. The reduction in the rotational speed n takes place over a plurality of full revolutions of the rotor shaft 8.

In this state—in other words while the rotor shaft 8 is coasting down—the steps S24 to S27 are executed repeatedly (at the current controller clock rate). In step S24 the drive controller 5 receives respective raw signals x, y, α' from the position transmitter 9. In step S25 the drive controller 5 determines the associated raw position α' in each case based on the respective raw signals x, y, α'. If the drive controller 5 has already received the raw position α' as a raw signal α' in step S25, the determination of the raw position α' is of minor importance. The step S25 is in this case degraded.

In step S26 the drive controller 5 stores the raw position α' in the buffer memory 10. The storage in the buffer memory 10 takes place such that the respective raw position α' is stored in addition to raw positions α' already saved in the buffer memory 10. Where necessary, the associated detection time tn (n=1, 2, 3, . . . N) is further assigned to the respective raw position α' and is likewise saved in the buffer memory 10.

In step S27 the drive controller 5 checks whether the determination and buffering of the raw positions α' should be terminated. For example, the drive controller 5 can in each case determine a current rotational speed n of the rotor shaft 8 in step S27 based on the respective raw position α', and check whether the current rotational speed n reaches or undershoots a minimum rotational speed n2. The minimum rotational speed n2 can be a suitable percentage of the initial rotational speed n1, for example somewhere between 60% and 20% of the initial rotational speed n1, in particular between 50% and 30%. According to FIG. 6 the minimum rotational speed n2 is 2000 rpm, for example. If the minimum rotational speed n2 is reached or undershot, the determination and buffering of the raw positions α' is terminated. Otherwise the drive controller 5 returns to step S24. Alternatively to reaching or undershooting the minimum rotational speed n2, a check could for example also be made in step S27 as to whether a sufficiently long time has elapsed since the start of the coasting down of the rotor shaft 8. It is also possible to check in the context of step S27 whether a particular number of full revolutions of the rotor shaft 8 has taken place since the start of detection of the raw signals x, y, α', in particular at least one full revolution.

If the determination and buffering of the raw positions α' is terminated, the drive controller 5 moves on to step S28. In step S28 the drive controller 5 determines at least the correction variables rej, imj. The determination of the correction variables rej, imj takes place based on the raw positions α' saved in the buffer memory 10. Not only a single raw position α' is utilized here, but a plurality of raw positions α' saved in the buffer memory 10. The drive controller 5 saves the determined correction variables rej, imj in step S29 in a correction variable memory 11. As a result, the correction variables rej, imj are available in the subsequent normal operation for determining the respective actual position α.

The drive controller 5 models the coasting down of the rotor shaft 8 in accordance with a model 12. The model 12 has a number of model parameters ki (where i=1, 2, 3 . . . ). For example in accordance with the illustration in FIG. 2 the model 12 has the form $$\alpha = \sum_{i=0}^{N1} ki \cdot t^i \qquad (4)$$

Here t is the time t from the start of the non-powered operation of the electric machine 1. Alternatively to modeling using a polynomial of the time t, modeling using an exponential function is also possible.

Figure 5:
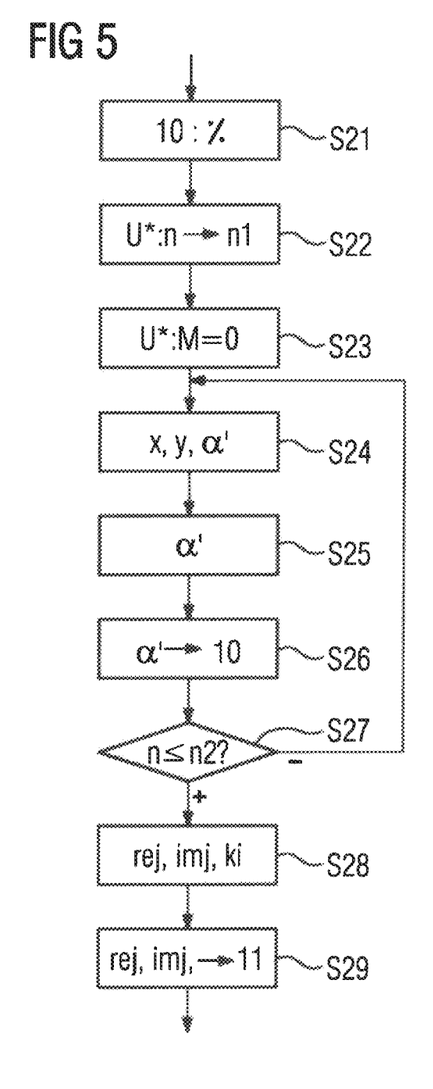
Figure 6:
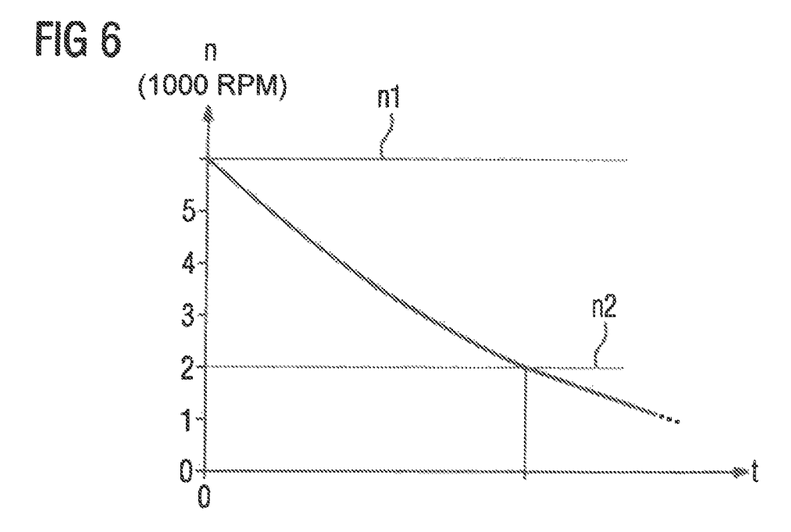

Preferably the drive controller 5 in accordance with the illustration in FIG. 5 determines in the context of step S28 not only the correction variables rej, imj, but additionally too the model parameters ki. This is readily possible providing a large enough number of raw positions α' are stored in the buffer memory 10 and thus are available to determine the correction variables rej, imj and the model parameters ki.

Figure 7:
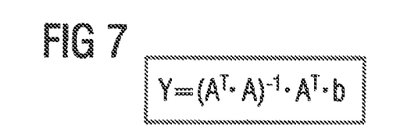

In the context of step S27 the drive controller 5 determines the correction variables rej, imj and if appropriate also the model parameters ki using an overdetermined equation system. The determination further preferably takes place in accordance with a method in which the error squares are minimized. In particular, the drive controller 5 can determine the correction variables rej, imj and the model parameters ki in accordance with the illustration in FIG. 7 in consequence according to the relationship $$Y=(A^T \cdot A)^{-1} \cdot A^T \cdot b \qquad (5)$$

Figure 8:
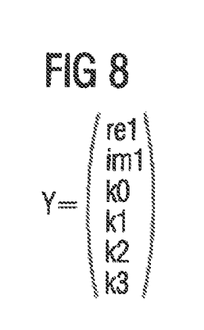
Figure 9:
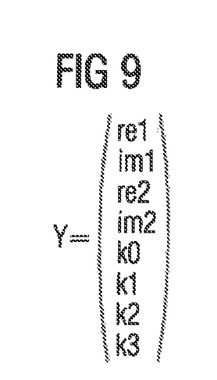

Y is a solution vector Y, the components of which are the correction variables rej, imj and the model parameters ki being searched for. FIG. 8 shows the solution vector Y for the event that only the correction variables re1, im1 are determined for the fundamental frequency and the highest power of the time t considered in the model 12 is the third power, in other words that in addition to the correction variables re1, im1 the model parameters k0, k1, k2 and k3 are determined. FIG. 9 shows the solution vector Y for the event that in addition to the correction variables re1, im1 for the fundamental frequency, the correction variables re2, im2 for the first harmonics are determined and the highest power of the time t considered in the model 12 is the third power.

Figure 10:
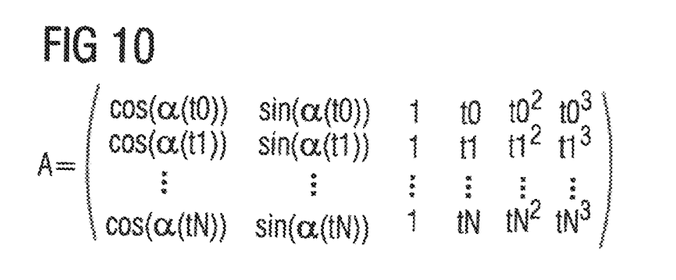
Figure 11:
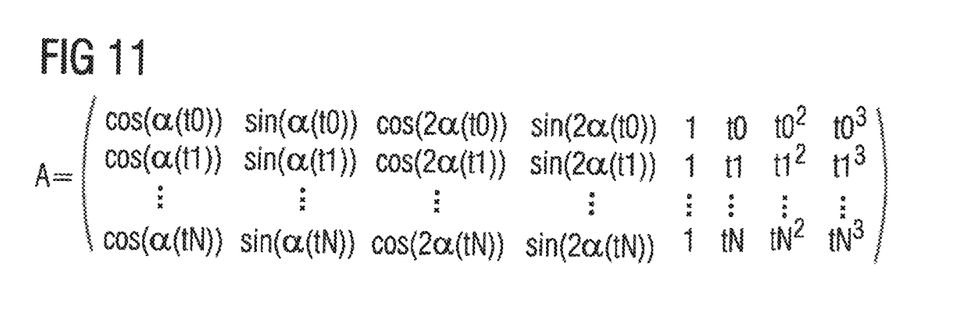
Figure 12:
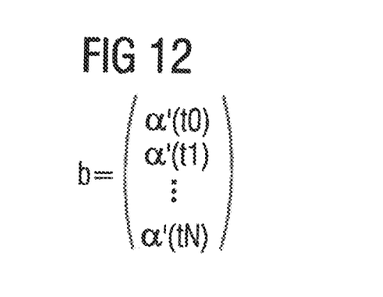

A is a matrix. $A^T$ is the associated transposed matrix. FIG. 10 shows the matrix A for the event that only the correction variables re1, im1 for the fundamental frequency are determined and that the highest power of the time t considered in the model 12 is the third power. FIG. 11 shows the matrix A for the event that in addition to the correction variables re1, im1 for the fundamental frequency, the correction variables re2, im2 for the first harmonics are determined and the highest power of the time t considered in the model 12 is the third power. tn are the detection times tn at which the respective raw positions α' were determined.

b is a raw position vector in accordance with the illustration in FIG. 12.

It would be possible for the highest power of the time t considered in the model 12 to be the second power. In this case the last component in the solution vector Y illustrated in FIGS. 8 and 9 would be omitted and correspondingly to this the last column in the matrix A illustrated in FIGS. 10 and 11 would be omitted. It would likewise be possible for the highest power of the time t considered in the model 12 to be the fourth power. In this case a further column would be added to the solution vector Y illustrated in FIGS. 8 and 9 additionally as a further component of the model parameters k4 not illustrated in FIGS. 8 and 9 and correspondingly hereto in the matrix A illustrated in FIGS. 10 and 11, in which column the fourth power of the detection time tn is entered in each case.

In summary, the present invention thus relates to the following subject:

An electric drive comprises an electric machine 1 supplied with electrical energy via a converter 2. In normal operation a drive controller 5 continuously receives respective raw signals x, y, α' from a position transmitter 9 detecting a rotational position of a rotor shaft 8 of the electric machine 1 and in each case determines an actual position α of the rotor shaft 8 based on the raw signals x, y, α' in conjunction with correction variables rej, imj. As a function of a respective target position α* and the respective actual position α or a respective target rotational speed n* and a respective actual rotational speed n of the electric machine 1 determined using the respective actual position α it determines respective control signals U* for the converter 2 and outputs them to the converter 2. In special operation the drive controller 5 first determines control signals U* for the converter 2, based on which the rotor shaft 8 rotates at an initial rotational speed n1, and outputs it to the converter 2. It then operates the electric machine 1 in a non-powered manner, so that the rotor shaft 8 coasts down. During the coasting down the drive controller 5 continuously receives respective raw signals x, y, α' from the position transmitter 9, in each case determines a raw position α' of the rotor shaft 8 therefrom and stores it. Based on a plurality of raw positions α' determined in special operation it determines the correction variables rej, imj and saves them in a correction variable memory 11, so that they are available in normal operation for determining the respective actual position α.

The present invention has many advantages. In particular, the determination of the correction variables rej, imj is possible without any additional hardware. Only the drive controller 5, which is present in any case, and the position transmitter 9, which is present in any case, are required. Nevertheless, a very precise determination of the correction variables rej, imj is possible. A residual error remaining in the actual position α can be reduced to less than 20% of the error which is present in the respective corresponding raw position α'.

Although the invention has been illustrated and described in greater detail on the basis of the preferred exemplary embodiment, the invention is not limited by the disclosed examples and other variations may be derived herefrom by the person skilled in the art without leaving the scope of protection of the invention.

The invention claimed is:

1. A drive controller for an electric drive of an electric machine receiving electrical energy via a converter, wherein the drive controller is configured to operate in a normal operation or in a special operation,
   wherein the drive controller, in the normal operation, continuously
   receives raw signals from a position transmitter disposed on the electric machine and detects a rotational position of a rotor shaft of the electric machine,
   determines an actual position of the rotor shaft based on the received raw signals in conjunction with correction variables determined during the special operation, and
   determines for the converter control signals based on a target position and the actual position or based on a target rotational speed and an actual rotational speed of the rotor shaft, with the actual rotational speed being determined from the actual position, and outputs the determined control signals to the converter,
   wherein the drive controller, in the special operation,
   first determines for the converter control signals that cause the rotor shaft to rotate at an initial rotational speed, and outputs the first determined control signals to the converter,
   thereafter operates the electric machine in a non-powered manner causing the rotor shaft to coast down,
   while the rotor shaft coasts down, continuously receives the raw signals from the position transmitter, determines therefrom raw positions of the rotor shaft, and buffers the determined raw positions,
   models the coasting down of the rotor shaft in accordance with a model comprising model parameters,
   determines based on the determined raw positions the correction variables and the model parameters, and
   saves the determined correction variables in a correction variable memory and makes the determined correction variables available in the normal operation for determining the actual position.

2. The drive controller of claim 1, wherein in the special operation, the drive controller checks based on the raw signals, whether a current rotational speed of the rotor shaft reaches or undershoots a minimum rotational speed that is lower than the initial rotational speed, stops, when the rotor shaft reaches or undershoots the minimum rotational speed, the determining and the buffering of the determined raw positions, and transitions to determining the correction variables.

3. The drive controller of claim 1, wherein the model has the form $$\alpha = \sum_{j=0}^{N1} ki \cdot t^i,$$

wherein α denotes the actual position of the rotor shaft, t denotes a time from a start of the non-powered operation of the electric machine, and ki denotes the model parameters.

4. The drive controller of claim 3, wherein N1 has an integer value of 2, 3 or 4.

5. The drive controller of claim 1, wherein in the normal operation, the drive controller determines the raw position from the received raw signals, and determines from the determined raw position the actual position of the rotor shaft based on the relationship $$\alpha = \alpha' - \sum_{j=1}^{N2} [rej \cdot \cos(j\alpha') + imj \cdot \sin(j\alpha')],$$

wherein α is the actual position, α' is the raw position, and rej and imj are the correction variables.

6. The drive controller of claim 5, wherein N2 has an integer value of 1 or 2.

7. The drive controller of claim 1, wherein the drive controller determines the correction variables based on an overdetermined system of equations by a least-square error method.

8. An electric drive, comprising
a converter,
an electric machine receiving electrical energy via the converter, and
a drive controller,
wherein the drive controller is configured to operate in a normal operation or in a special operation,
wherein the drive controller, in the normal operation, continuously
receives raw signals from a position transmitter disposed on the electric machine and detecting a rotational position of a rotor shaft of the electric machine,
determines an actual position of the rotor shaft based on the received raw signals in conjunction with correction variables determined during the special operation, and
determines for the converter control signals based on a target position and the actual position or based on a target rotational speed and an actual rotational speed of the rotor shaft, with the actual rotational speed being determined from the actual position, and outputs the determined control signals to the converter, wherein the drive controller, in the special operation, first determines for the converter control signals that cause the rotor shaft to rotate at an initial rotational speed, and outputs the first determined control signals to the converter, thereafter operates the electric machine in a non-powered manner causing the rotor shaft to coast down, while the rotor shaft coasts down, continuously receives the raw signals from the position transmitter, determines therefrom raw positions of the rotor shaft, and buffers the determined raw positions, models the coasting down of the rotor shaft in accordance with a model comprising model parameters, determines based on the determined raw positions the correction variables and the model parameters, and saves the determined correction variables in a correction variable memory and makes the determined correction variables available in the normal operation for determining the actual position.

* * * * *